US011487522B1

(12) United States Patent
Singh et al.

(10) Patent No.: US 11,487,522 B1
(45) Date of Patent: Nov. 1, 2022

(54) TRAINING AND/OR USING NEURAL NETWORK MODEL TO GENERATE TARGET SOURCE CODE FROM LOWER-LEVEL REPRESENTATION

(71) Applicant: X Development LLC, Mountain View, CA (US)

(72) Inventors: Rishabh Singh, San Jose, CA (US); Nisarg Vyas, Gujarat (IN); Jayendra Parmar, Gujrat (IN); Dhara Kotecha, Gujarat (IN); Artem Goncharuk, Mountain View, CA (US); David Andre, San Francisco, CA (US)

(73) Assignee: X DEVELOPMENT LLC, Mountain View, CA (US)

( * ) Notice: Subject to any disclaimer, the term of this patent is extended or adjusted under 35 U.S.C. 154(b) by 0 days.

(21) Appl. No.: 17/318,687

(22) Filed: May 12, 2021

Related U.S. Application Data

(60) Provisional application No. 62/705,432, filed on Jun. 26, 2020.

(51) Int. Cl.
*G06F 8/51* (2018.01)
*G06N 3/04* (2006.01)
*G06F 8/53* (2018.01)
*G06F 8/41* (2018.01)
*G06N 3/08* (2006.01)
*G06F 8/52* (2018.01)

(52) U.S. Cl.
CPC .................. *G06F 8/51* (2013.01); *G06F 8/41* (2013.01); *G06F 8/52* (2013.01); *G06F 8/53* (2013.01); *G06N 3/04* (2013.01); *G06N 3/08* (2013.01)

(58) Field of Classification Search
None
See application file for complete search history.

(56) References Cited

U.S. PATENT DOCUMENTS

| 11,249,891 | B1 * | 2/2022 | Patel-Schneider ......................... G06F 11/3688 |
| 2007/0038985 | A1 * | 2/2007 | Meijer ...................... G06F 8/51 717/137 |
| 2021/0011694 | A1 * | 1/2021 | Ni ............................. G06F 8/51 |
| 2021/0294725 | A1 * | 9/2021 | Hong ................... G06F 11/3612 |

\* cited by examiner

*Primary Examiner* — Lewis A Bullock, Jr.
*Assistant Examiner* — Mark A Gooray
(74) *Attorney, Agent, or Firm* — Middleton Reutlinger

(57) ABSTRACT

Training and/or utilization of a neural decompiler that can be used to generate, from a lower-level compiled representation, a target source code snippet in a target programming language. In some implementations, the lower-level compiled representation is generated by compiling a base source code snippet that is in a base programming language, thereby enabling translation of the base programming language (e.g., C++) to a target programming language (e.g., Python). In some of those implementations, output(s) from the neural decompiler indicate canonical representation(s) of variables. Technique(s) can be used to match those canonical representation(s) to variable(s) of the base source code snippet. In some implementations, multiple candidate target source code snippets are generated using the neural decompiler, and a subset (e.g., one) is selected based on evaluation(s).

20 Claims, 7 Drawing Sheets

DOES TARGET SOURCE CODE SNIPPET CONFORM TO SYNTAX OF TARGET PROGRAMMING LANGUAGE? 602

CAN TARGET SOURCE CODE SNIPPET BE COMPILED USING TARGET PROGRAMMING LANGUAGE COMPILER? 604

DOES OUTPUT OF TARGET SOURCE CODE SNIPPET, IF COMPILED AND EXECUTED, MATCH OUTPUT OF BASE SOURCE CODE SNIPPET IF COMPILED AND EXECUTED? 606

CONSIDER MULTIPLE OUTPUT(S) EACH BASED ON DIFFERENT VALUE(S) FOR VARIABLE(S) 606A

HOW DISTANT, IN EMBEDDING SPACE, IS GENERATED EMBEDDING OF TARGET SOURCE CODE SNIPPET TO GENERATED EMBEDDING OF BASE SOURCE CODE SNIPPET? 608

WHAT IS SIZE AND/OR COMPLEXITY OF TARGET SOURCE CODE SNIPPET? 610

FIG. 6

TRAINING AND/OR USING NEURAL NETWORK MODEL TO GENERATE TARGET SOURCE CODE FROM LOWER-LEVEL REPRESENTATION

BACKGROUND

Computer software programming often requires developers to read and/or write source code (i.e., to program) in a specific higher-level programming language. Some non-limiting examples of higher-level programming languages include Java, C++, C, Python, Perl, etc.—each of which can have its own strengths, weaknesses, nuances, idiosyncrasies, etc.

Many programmers obtain at least a superficial understanding of multiple programming languages, but only master a few. Consequently, this can cause problems when an entity (e.g., a company) wants to translate code from a base higher-level programming language to a different target programming language. For example, existing programmers at the entity may lack expertise in the target programming language and be unable to manually translate the code and/or can be highly inefficient in doing so. The inefficiencies can lead to excess usage of client device resources utilized in translating the code. Put another way, the inefficiencies can result in a client device, being used in manually translating the code, to be on and/or in a higher-powered state for prolonged periods. Even if new programmer(s) familiar with the target language were brought in for the translating, manually translating is nonetheless still inefficient, at least due to the new programmers being unfamiliar with the semantics of the base code being translated. Even outside of the automatic translating context, excess usage of client device resources can also occur when programmers attempt to code in a new language with which they have lesser expertise relative to other language(s). This can be due to the programmers being slower when coding in the new language which, in turn, prolongs the duration that client device resource(s) need to be active when coding in the new language.

SUMMARY

Implementations disclosed herein relate to utilization of machine learning model(s) (e.g., neural network model(s)) in automatically translating source code in a "base" programming language to source code in another programming language, or "target" programming language. Implementations disclosed herein can enable automatic translation of source code from the base programming language to the target programming language, while mitigating the amount of programmer time (and corresponding client device usage) that is involved. For example, some or all snippets of source code can be translated from the base programming language to the target programming language, without requiring any human intervention. For instance, a translated target language snippet can optionally be presented to a programmer for review and potential editing, but the programmer will not be involved in the generation of the translated target language snippet.

As described herein, the machine learning model(s) that are utilized in translating base source code to target source code can be trained based on actual human-created code. As a result, generated target source code snippets can be more natural and, as a result, comprehensible by developers in a more efficient manner—which results in more efficient usage of client device resource(s) in reviewing and/or editing the target source code snippets. For example, generated target source code snippets can be more natural than those generated using only rules-based approaches.

Implementations disclosed herein can additionally or alternatively enable programmers who might be unfamiliar with a base programming language to nonetheless view and/or edit source code written in the base programming language by translating the source code to another programming language that is more familiar to the programmer.

Implementations disclosed herein can additionally or alternatively enable generating source code in a target language based on only a previously generated lower-level compiled representation. For example, the lower-level compiled representation can be assembly code or bytecode, and could have been previously generated by processing the corresponding base source code (in the target language or another language) using a compiler. Accordingly, those implementations enable generating the source code in the target language using the lower-level representation and without requiring any access to the base source code on which it is based.

In implementations that automatically translate a base source code snippet, programmed in a base programming language (e.g., C++), the base source code snippet can be compiled, using a compiler for the base programming language, to generate a lower-level compiled representation thereof. As used herein, the "lower-level compiled representation" can refer to bytecode, object code, binary code, assembly code, and/or any other representation of source code that is less human-readable than source code from which the low-level representation was generated.

The lower-level compiled representation can then be processed, using a "neural decompiler". The neural decompiler can be a machine learning model trained to decompile lower-level representations to a target higher-level programming language (e.g., Python), to generate output(s). For example, the machine learning model can be a sequence-to-sequence neural network model that processes the lower-level compiled representation to generate a sequence of outputs, such as a sequence of outputs that each include a probability distribution over tokens. For instance, the neural network model can be a transformer or can be a recurrent neural network (RNN) encoder-decoder model that include memory layer(s) (e.g., long short-term (LSTM) layer(s). Each of the tokens can be a word, word piece, symbol, and/or other token, and the tokens can include those that form a lexicon of the target higher-level programming language, and optionally other tokens (e.g., end of code snippet symbols, canonical variables and/or other variables, etc.).

In various implementations, the machine learning model can be trained based on training instances that each include labeled training instance output of a target source code snippet that is in a target programming language, and training instance input that is a lower-level compiled representation of the target source code snippet. The training instances can be generated by identifying (e.g., from code repositories) target source code snippets, and compiling the target source code snippets using a compiler for the target higher-level programming language. Each training instance can include a target source code snippet (as output), and its corresponding lower-level compiled representation. As one example, all or portions of target source code, for a corresponding function of a program, can be compiled, using a compiler for the target source code, to generate a lower-level representation of the all or portions of the target source code. Further, metadata from the compiler can be utilized to determine correspondences between target source code snippets and corresponding snippets of the lower-level representation. Such correspondences can be used to generate pairing of target source code snippets and corresponding snippets of the lower-level representation. For example, the compiler metadata can indicate, for each line and/or expression (or even sub-expression) of the target source code, which line(s) of the lower-level representation correspond thereto. Accordingly, the compiler metadata can be used to generate training instances that each include corresponding line(s) and/or expression(s) (or sub-expression(s)) of the target source code and line(s) of the lower-level representation.

A target source code snippet, in the target language, can be generated by processing, using the neural decompiler, a lower-level compiled representation (e.g., a lower-level compiled representation of a base source code snippet) to generate output(s). For example, where the output(s) include a sequence of output(s), the target source code snippet can be generated, token-by-token, by selecting the highest probability token for each output of the sequence.

The generated target source code snippet can then be rendered as output of a software development application for optional review and/or editing by developer(s). For example, an entire program, or module, can be automatically translated from a base programming language (e.g., C++) to a target language (e.g., Python) by automatically translating snippets as described above. Each of the snippets can be, for example, a line of code, a portion of a line of code, multiple lines of code, and/or other contiguous portion of code.

In some implementations that translate a base source code snippet to a target source code snippet, the base source code snippet that is compiled can be a modified base source code snippet that is generated by replacing occurrences of each of any variables in the snippet, with a corresponding canonical representation selected from a closed set of canonical representations. For example, the base source code snippet "char a123='a'" can be modified by replacing the variable "a123" with the canonical representation "v1", resulting in the modified base source code snippet "char v1='a'". Accordingly, the lower-level compiled representation will be generated based on the canonical representation "v1" in lieu of the actual variable "a123". It is noted that the canonical representation "v1" may or may not actually be present in the lower-level compiled representation but, nonetheless, the lower-level compiled representation will be influenced by inclusion of "v1" in lieu of "a123".

Further, the training instances used in training the neural decompiler can additionally or alternatively be trained based on training instances that include similarly generated canonicalized target source code snippets and lower-level representations based on those canonicalized target source code snippets. The canonicalized target source code snippets can be generated by replacing occurrences of each of any variable, in an initial target source code snippet, with a corresponding canonical representation. The canonical representations used in replacing variables, in target source code snippets, in generating canonicalized target source code snippets for use in training instances, can also be selected from a closed set of canonical representations. That closed set can be the same as, or different from, the closed set used in generating the modified base source code snippets. As one example, assume a target source code snippet of "double add(height, height)". A canonicalized target source code snippet of "double add(x1, x1)" can be generated that replaces the variable "height" with the canonicalized representation of "x1" (e.g., selected from a closed set of (x1, x2, . . . , x10). As another example, assume a target source code snippet of "double add(double height, double width)". A canonicalized target source code snippet of "double add(double x1, double x2)" can be generated that replaces the variable "height" with the canonicalized representation of "x1" and that replaces the variable "width" with "x2".

Accordingly, the neural decompiler can be trained to process lower-level code that is generated based on snippets that include the canonical representations (the same as or different from those used in modifying the base source code snippets) in lieu of actual variable names, and to generate target source code snippets that include the canonical representations in lieu of actual variable names. Training the neural decompiler based at least in part on (or even exclusively based on) canonicalized training instances can result in the neural decompiler being trained more efficiently (i.e., requiring fewer training instances) and/or can lead to the neural decompiler being more robust and/or more accurate. This can be due to the canonicalizations enabling training of the neural decompiler to focus on predicting the non-variable portions and only a closed set of a limited quantity (e.g., 20 or fewer, 10 or fewer) of canonical representations of variable(s) without needing to focus on predicting disparate variables. Further, this can also enable the output space (e.g., the quantity of tokens) of the neural decompiler to be more constrained as token(s) that may be present in initial variables, but are not included in the lexicon of the target programming language, need not be represented in the output space. For example, the neural decompiler can be trained exclusively based on canonicalized training instances and can include, in its lexicon, canonical representations of variables without including certain token(s) that would be needed to represent other variables. In addition to making the neural decompiler more compact, this can enable more efficient training of the neural decompiler and/or the neural decompiler to be more robust as it enables the neural decompiler to be trained and/or utilized independent of variable name choice.

Accordingly, training the neural decompiler based on canonical representations can result in predicted target source code snippets, generated using the neural decompiler, being more likely to include (or restricted to including) canonical representations to represent variable(s) in predicted target source code snippet(s). The canonical representation(s), present in the initial predicted target source code snippets generated using the trained neural decompiler, can then be replaced with the corresponding variable names from the base source code snippet—resulting in a modified target source code snippet. The modified target source code snippet can then be the one that is presented to developer(s) in a developer interface. In these and other manners, the viewed translated modified target source code snippets will be more intelligible when reviewed by developer(s) and, further, will maintain consistent variable names with other translated target source code snippets. Yet further, using the canonical representations, in lieu of the actual variable names, can enable the neural decompiler to be more robust and/or trained more quickly.

It is noted that, in various implementations, there will not be a strict 1:1 mapping between the canonical representation(s) of the base code snippet and the canonical representation(s) of the source code snippet. For example, assume canonical representations of "v1" for a first variable and "v2" for a second variable, in the base source code snippet. There may not be a guarantee that "v1" in the initial target source code snippet generated using the neural decompiler corresponds to "v1" in the base source code snippet and it may even be the case that "v1" is not even present in the initial target source code snippet. For example, "v3" or "x1" or other canonical representation may be present in the initial target source code snippet in lieu of "v1". When there is only one variable in the base source code snippet, and only one canonical representation (matching or not) in the initial target source code snippet, it can easily be determined that the canonical representation in the initial target source snippet matches the variable of the base source code snippet. However, when multiple variables are present in the base source code snippet, it can be more difficult to match canonical representations of an initial predicted target source code snippet to corresponding variables in the base source code snippet.

In view of these and/or other considerations, one or more techniques can be utilized to ensure a "match" of canonical representations, of an initial target source code snippet, to variables of the base source code snippet, in generating the modified target source code snippet. This can include considering the sequential order of the variables in the base source code snippet and the sequential order of the canonical representations in the initial target source code snippet. This can additionally or alternatively include considering corresponding types assigned to the variables in the base source code snippet and types assigned to the canonical representations in the initial target source code snippet. This can additionally or alternatively include considering other portion(s) of code preceding and/or following the variables in the base source code snippet and other portion(s) of code preceding and/or following the canonical representations in the initial target source code snippet. This can additionally or alternatively include, for a given variable mapping in the target source code snippet (i.e., a given replacement of canonical representations with variables), generating output(s) that are each based on executing the target source code snippet (with the given variable mapping) with test input(s) (e.g., certain values for the variables). Output(s) can likewise be generated for the initial base source code snippet, using the same test input(s). The base output(s) generated for the base source code snippet can be compared to the target output(s) generated for the target source code snippet. If the base output(s) match the target output(s), this can indicate that the given variable mapping is correct—and it can be utilized.

In some additional or alternative implementations, where the output(s) from the neural decompiler include a sequence of output(s) and probability distributions, an additional target source code snippet can be at least selectively generated by selecting token(s) that are not the highest probability token for the output(s) of the sequence. For example, an additional target source code snippet can include one or more (e.g., a subset or all) of the second-highest probability tokens in lieu of the highest probability tokens.

In some of those implementations, the additional target source code snippet can be selectively utilized, in lieu of the higher probability target source code snippet that is based on the highest probability tokens. For example, the additional snippet can be utilized if it conforms more closely to syntax of the target programming language than does the initial target source code snippet. As another example, the additional snippet can be utilized if it can be compiled using compiler(s) for the target programming language whereas the initial target source code snippet cannot be compiled using the compiler(s) (e.g., it generates error(s)).

As yet another example, the base source code snippet can additionally or alternatively be executed (e.g., compiled then executed), with given value(s) for any variable(s), to generate base source code output. Further, the highest probability source code snippet can likewise be executed to generate first target output and the additional target source code snippet can likewise be executed to generate second target output. If the first target output fails to match the base source code output, but the second target output (for the additional target source code snippet) matches the base source code output (or matches it more closely), the additional source code snippet can be utilized in lieu of the highest probability source code snippet.

As yet another example, an embedding for the base source code snippet can additionally or alternatively be generated (e.g., using code2vec or other model(s)), and embeddings similarly generated for the initial target source code snippet and the additional target source code snippet. The additional target source code snippet can be utilized, in lieu of the initial target source code snippet, based on its embedding being closer (distance-wise in embedding space) to the base source code snippet than is the embedding for the initial target source code snippet. In these and other manners multiple candidate target snippets can be generated utilizing the neural decompiler, evaluated according to one or more criteria, and the best (according to the evaluation) target snippet selected for presentation in a developer interface. In some implementations the additional target source code snippet(s) are only generated and/or evaluated responsive to determining that the highest probability target source code snippet fails to satisfy one or more criteria.

The preceding is provided as an overview of only some implementations disclosed herein. These and other implementations are described in additional detail in the detailed description.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIG. 6 illustrates example blocks that may be performed in evaluating a target source code snippet, alone or in relation to other target source code snippet(s).

DETAILED DESCRIPTION

Figure 1:
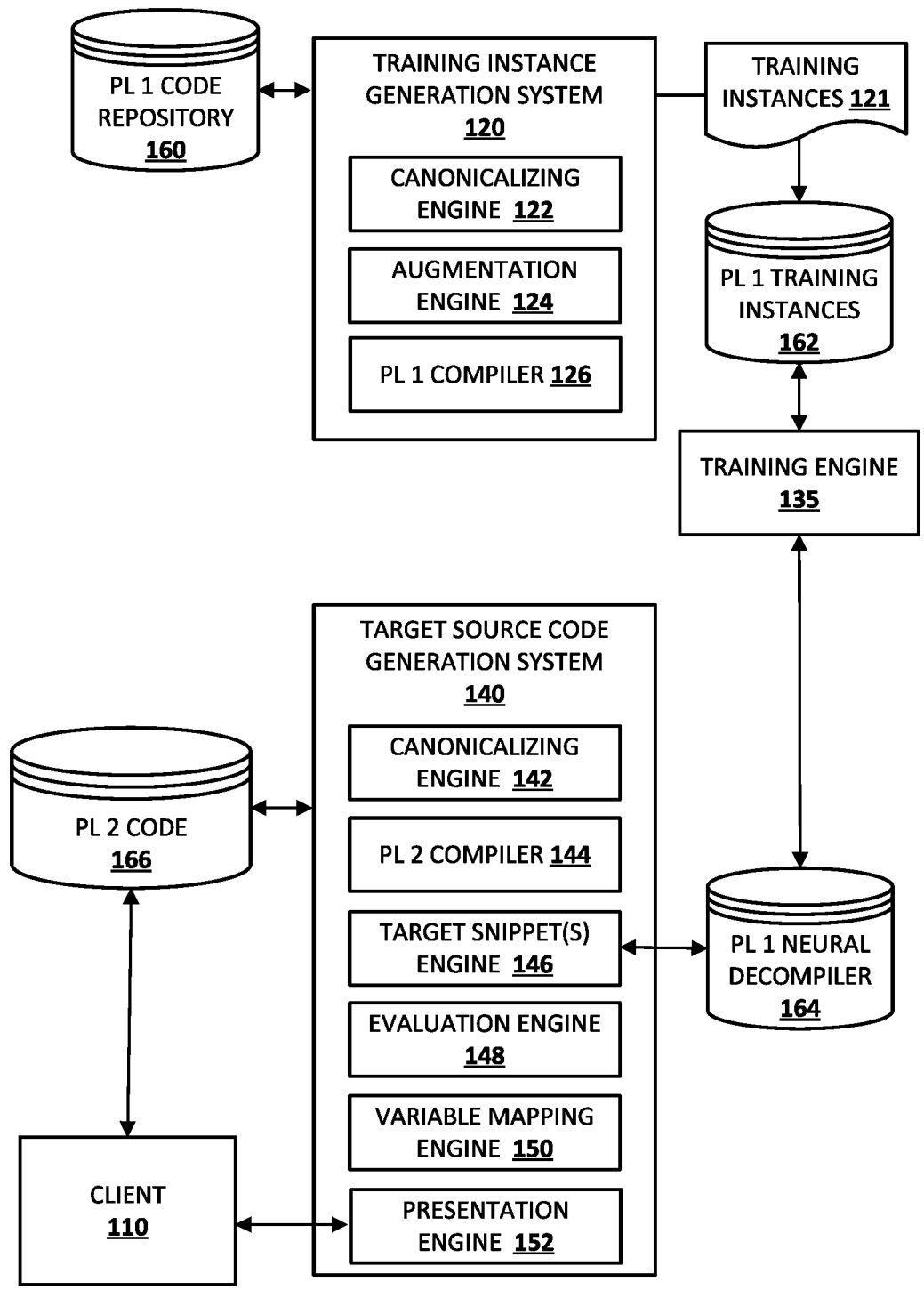
FIG. 1 schematically depicts an example environment in which selected aspects of the present disclosure may be implemented, in accordance with various implementations.

FIG. 1 schematically depicts an example environment in which selected aspects of the present disclosure may be implemented, in accordance with various implementations. Any computing devices, systems, and engines depicted in FIG. 1 or elsewhere in the figures may include logic such as one or more microprocessors (e.g., central processing units or "CPUs", graphical processing units or "GPUs") that execute computer-readable instructions stored in memory, or other types of logic such as application-specific integrated circuits ("ASIC"), field-programmable gate arrays ("FPGA"), and so forth. Some of the systems and/or engines depicted in FIG. 1, such as training instance generation system 120, target source code generation system 140, and training engine 135 can be implemented using one or more server computing devices that form what is sometimes referred to as a "cloud infrastructure," although this is not required.

Training instance generation system 120 of FIG. 1 can utilize a first programming language ("PL 1") code repository 160, and/or other repository/repositories for PL 1, in generating training instances 121. The code repository 160 (and/or other repositories for PL 1) can include one or more publicly accessible Internet repositories and/or one or more access-restricted repositories that each include multiple instances of programs, functions, and/or line(s) of code that are each crafted, by a corresponding developer, in the first programming language.

The training instances 121 that are generated by the training instance generation system 120 can each include: (a) training instance output that includes a source code snippet for a first programming language ("PL 1"); and (b) training instance input that includes at least one lower-level complied representation (e.g., one or more of assembly code, bytecode, object code, binary code, and assembly code) of the source code snippet. The source code snippets of the training instances 121 can each be based on (e.g., conform to, or derived from) a corresponding snippet of PL 1 code from the repository 160 (or other repository) and the lower-level compiled representations of the training instances 121 can each be generated by compiling a corresponding source code snippet using a compiler for PL 1 (e.g., PL 1 compiler 126 or other compiler).

The generated training instances 121 are stored in PL 1 training instances database 162 and can be used by training engine 135 in training PL 1 neural decompiler 164. The neural decompiler 164 can be a neural network model and, when trained, can be used to decompile lower-level representations to the first programming language. For example, the neural decompiler 164 can be a sequence-to-sequence neural network model that processes the lower-level compiled representation to generate a sequence of outputs, such as a sequence of outputs that each include a probability distribution over tokens. For instance, the neural decompiler 164 can be a transformer, an RNN encoder-decoder model that includes memory layer(s), and/or other neural network model architecture(s). Each of the tokens represented by the output can be a word, word piece, symbol, and/or other token, and the tokens can include those that form a lexicon of PL 1, and optionally other tokens (e.g., end of code snippet symbols, canonical variables and/or other variables, etc.).

For the sake of simplicity, training instance generation system 120 is depicted in FIG. 1 along with other components for the first programming language (i.e., PL 1 code repository 160, PL 1 training instances database, and a PL 1 neural decompiler 164). However, it is understood that in various implementations training instance generation system 120 can also be used to generate training instances for additional programming languages. For example, training instance generation system 120 can utilize similar techniques in generating training instances for a second programming language, a third programming language, a fourth programming language, etc. Further, in those implementations the training instances for each of the additional programming languages can be used by training engine 135 (or an additional training engine 135) in training a corresponding neural decompiler for each of the additional programming languages. For example, training engine 135 can use second programming language training instances to train a separate neural decompiler that, when trained, can be used to decompile lower-level representations to the second programming language. As another example, training engine 135 can use second programming language training instances to train a separate neural decompiler that, when trained, can be used to decompile lower-level representations to the third programming language. The output space of each neural decompiler can optionally be tailored to the respective programming language for the neural decompiler. For example, each output generated using a neural decompiler can include a probability distribution over tokens, and the tokens represented by the outputs can optionally be specific to the respective programming language (e.g., represent a lexicon for the respective programming language). In these and other manners, each neural decompiler can be specific to (e.g., have an output space that is specific to) and/or trained for a specific programming language (and optionally a specific version of the programming language). Further, each neural decompiler can be used to process a lower-level compiled representation to generate output(s) that can be used to generate target source code that is in the specific programming language and that conforms to the lower-level compiled representation. As described herein, the lower-level compiled representation that is processed can be one that is generated by compiling other source code that can differ from the generated target source code. For example, the other source code can be in a different programming language but can functionally correspond to the generated target source code.

Training instance generation system 120 is depicted in FIG. 1 as including a canonicalizing engine 122, an augmentation engine 124, and a PL 1 compiler 126. One or more of these components can be omitted from the training instance generation system 120 in various implementations.

The canonicalizing engine 122 can be used to modify an initial target source code snippet, obtained from PL 1 code repository 160 (or other repository) by replacing any variable(s) with a corresponding canonical representation. The corresponding canonical representations can optionally be selected from a closed set of canonical representations such as a closed set of {v1, v2, v3, . . . v10}. A modified target source code snippet, that is generated by canonicalizing engine 122 and includes the canonical representation(s) in lieu of the original variable(s), can be utilized as the output of a corresponding one of the training instances 121 in lieu of the initial target source code snippet. Further, the PL 1 compiler 126 can be used to compile the modified target source code snippet, in lieu of the initial target source code snippet. The lower-level compiled representation, from such compiling, can be the one used as training instance input in the corresponding one of the training instances 121.

Accordingly, the lower-level compiled representations and target source code snippets of at least some of (e.g., all, or at least a majority of) the training instances 121 can be generated based on canonical representations in lieu of actual variables. It is noted that the canonical representation(s) may or may not actually be present in the lower-level compiled representation but, nonetheless, the lower-level compiled representation will be influenced by inclusion of the canonical variables in lieu of the initial variables. Training the PL 1 neural decompiler 164 based at least in part on (or even exclusively based on) canonicalized training instances can result in the PL 1 neural decompiler 164 being trained more efficiently (i.e., requiring fewer training instances) and/or can lead to the neural decompiler 164 being more robust and/or more accurate. This can be due to the canonicalizations enabling training of the neural decompiler to focus on predicting the non-variable portions and only a closed set of a limited quantity (e.g., 20 or fewer, 10 or fewer) of canonical representations of variable(s) without needing to focus on predicting disparate variables.

Further, this can also enable the output space (e.g., the quantity of tokens) of the PL 1 neural decompiler 164 to be more constrained as token(s) that may be present in initial variables, but are not included in the lexicon of PL 1, need not be represented in the output space. Yet further, as described herein, when the PL 1 neural decompiler 164 is utilized in processing a lower-level compiled representation that is generated by compiling base source code in a disparate language using a compiler for the disparate language and, such base source code can likewise be similarly canonicalized to replace variable(s) with canonical representation(s). Generating the compiled base source code based on the canonicalized version of the base source code can improve the accuracy and/or robustness of a target source code snippet generated using the PL 1 neural decompiler 164. As described herein, when an initially generated target source code snippet, generated using the PL 1 neural decompiler 164, include canonical representation(s), one or more techniques can be utilized to generate a modified target source code snippet that incorporates the correct variables (e.g., from the base source code snippet) in lieu of the canonical representation(s). The modified target source code snippet can be the one that is presented to developer(s) in development interfaces(s) and/or that is executed.

The augmentation engine 124 can be used to generate additional target source code snippets that are each generated based on one or more initial source code snippets obtained from PL 1 code repository 160 (or other repository). The modification(s) performed by the augmentation engine 124 can be in addition to and/or in lieu of the replacement of variable(s) with canonical representation(s) that is performed by the canonicalizing engine 122. The modification(s) can result in additional target source code snippet(s), which can be used in generating additional training instances (i.e., paired with a corresponding lower-level representation compiled using PL 1 compiler). Such additional training instances can be generated efficiently and without requiring any human intervention. Further, the augmentation technique(s) used in generating such additional training instances can include those that result in target source code snippet(s) that might otherwise be rare (or even non-existent) in PL 1 code repository 160 (or other repository). Using such training instances in training of the PL 1 neural decompiler 126 can increase robustness of the PL 1 neural decompiler 126.

Some example techniques that can be utilized by the augmentation engine 124 are now described. For ease of explanation, a working example of a source code snippet of "double add(double a, double b) {return a+b}" is utilized. One example technique that can be used by the augmentation engine 124 is type signature transformation. With the type signature transformation, the augmentation engine 124 transforms each of one or more type(s), in the source code snippet, with a corresponding distinct but compatible type. For example, the "double" type can be replaced with the "integer" type. For instance, a training instance generated based on modifying the source code snippet of the working example can have output of "integer add(integer a, integer b) {return a+b" (where "integer" replaces "double") and input that is a lower-level compiled representation of the output.

Another example technique that can be utilized by the augmentation engine 124 is concatenating two or more source code snippets, and generating a training instance that includes output that is based on the concatenated source code snippets, and that includes input that is a lower-level compiled representation of the output. Assume the working example of a source code snippet of "double add(double a, double b) {return a+b}" and an additional source code snippet of "void writeImage(std::string const & fileName) {B1}". In such an example, a training instance can be generated with training instance output of "void addAndWriteImage(double a, double b, const &fileName){return a+b; B1}", where B1 denotes the respective function body; and with training instance input that is a lower-level compiled representation of the concatenated source code snippets. Additional or alternative concatenations can be generated, based on two or more source code snippets, by first modifying the source code snippet(s) according to one or more other techniques described herein (e.g., with type replacement or with replacing variable(s) with canonicalized variable(s)). Another example technique that can be utilized by the augmentation engine is expansion of function call(s), in a source code snippet, with their respective definition. Various examples have been described above, and some have been described in isolation for ease in explanation. However, it is understood that augmentation engine 124 can utilize additional and/or alternative techniques in generating multiple disparate training instances from a single source code snippet. Moreover, in various implementations multiple techniques can be combined in generating multiple disparate training instances.

Figure 2:
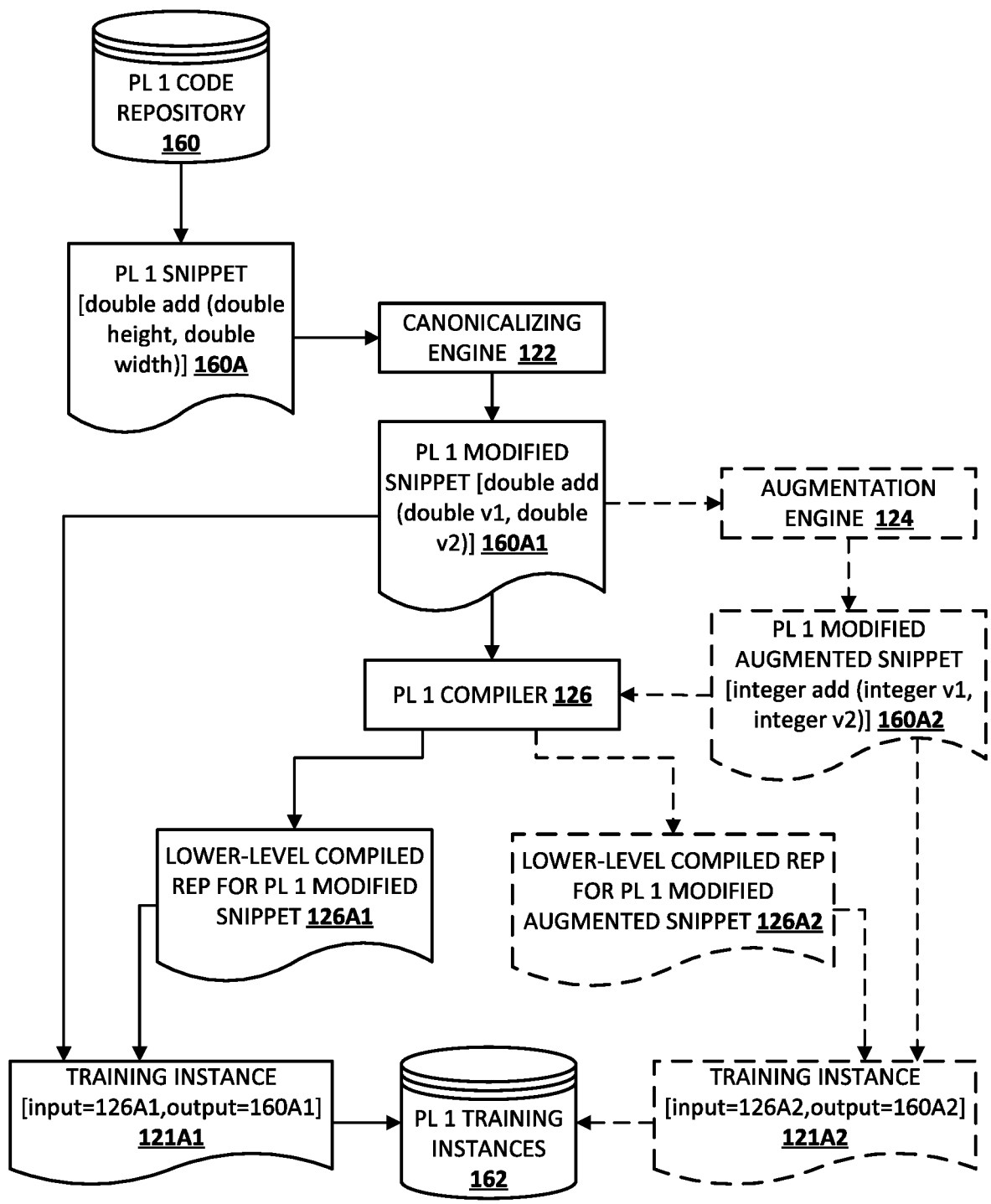
FIG. 2 is a block diagram showing an example of how components of the training instance generation system of FIG. 1 can generate training instances, in accordance with various implementations.

Turning briefly to FIG. 2, a block diagram is illustrated that shows an example of how components of the training instance generation system 120 can generate training instances 121A1 and 121A2, of training instances 121, for storage in PL 1 training instances database 162.

In FIG. 2, a PL 1 snippet 160A is obtained from PL 1 code repository. As a working example, the PL 1 snippet 160A can be "double add(double height, double width)". The canonicalizing engine 122 can modify the PL 1 snippet 160A by replacing variables "height" and "width" with corresponding canonical variables "v1" and "v2", resulting in a PL 1 modified snippet 160A1 of "double add(double v1, double v2)". In various implementations, the utilized "v1" and "v2" can be selected from a closed set of canonical variables, such as a close set that is represented in the output space of the PL 1 neural decompiler 164.

The PL 1 modified snippet 160A1 can be processed, by the PL 1 compiler 126, to generate a lower-level compiled representation for PL 1 modified snippet 126A1. The training instance 121A1 can be generated by including the PL 1 modified snippet 160A1 as the training instance output, and including the lower-level compiled representation for PL 1 modified snippet 126A1 as the training instance input.

Optionally, the augmentation engine 124 can modify the PL 1 modified snippet 160A1 by performing one or more augmentation techniques, such as the type signature transformation illustrated. In particular, in FIG. 2 the augmentation engine 124 replaces the type "double" with the type "integer", resulting in PL 1 modified augmented snippet 160A2 "integer add(double v1, double v2)". The PL 1 modified augmented snippet 160A2 can be processed, by the PL 1 compiler 126, to generate a lower-level compiled representation for PL 1 modified augmented snippet 126A2. The training instance 121A2 can be generated by including the PL 1 modified augmented snippet 160A2 as the training instance output, and including the lower-level compiled representation for PL 1 modified augmented snippet 126A2 as the training instance input. Although FIG. 2 illustrates augmentation engine 124 generating only PL 1 modified augmented snippet 160A2 based on PL 1 modified snippet 160A1, in various implementations augmentation engine 124 can generate additional augmented snippet(s) based on PL 1 modified snippet 160A1. For example, the augmentation engine 124 can generate an additional augmented snippet by concatenating PL 1 modified snippet 160A1 with an additional snippet. As another example, the augmentation engine 124 can generate an additional augmented snippet by concatenating PL 1 modified augmented snippet 160A2 with an additional snippet.

Returning again to FIG. 1, the target source code generation system 140 can use the PL 1 neural decompiler 164, once trained, to process a lower-level representation of source code and to generate output(s) that can be utilized to determine a target source code snippet, in the first programming language, that corresponds to the lower-level representation. In some of those implementations, the lower-level representation is a compiled representation generated based on processing a source code snippet in an additional programming language, utilizing a compiler for the additional programming language. For example, a source code snippet can be in a second programming language ("PL 2"), and obtained from PL 2 code database 166. That source code snippet can be compiled, using PL 2 compiler 144, to generate the lower-level compiled representation.

Target source code generation system 140 is depicted in FIG. 1 as including a canonicalizing engine 142, a PL 2 compiler 126, a target snippet(s) engine 146, an evaluation engine 148, a variable mapping engine 150, and a presentation engine 152. One or more of these components can be omitted from the target source code generation system 140 in various implementations.

The canonicalizing engine 142 can be used to modify an initial base source code snippet, such as a base source code snippet obtained from PL 2 code database 166 (or other database) by replacing any variable(s) with a corresponding canonical representation. The corresponding canonical representations can optionally be selected from a closed set of canonical representations such as a closed set of {v1, v2, v3, . . . v10}. A modified base source code snippet, that is generated by canonicalizing engine 142 and includes the canonical representation(s) in lieu of the original variable(s), can be compiled by the PL 2 compiler 144 to generate a lower-level compiled representation of the modified base source code snippet.

The target snippet(s) engine 146 can process the generated lower-level compiled representation (e.g., generated based on the modified base source code snippet, or the base source code snippet) using the trained PL 1 neural decompiler 164 to generate output(s). For example, where the output(s) include a sequence of output(s), the target snippet(s) engine 146 can generate a target source code snippet, token-by-token, by selecting the highest probability token for each output of the sequence. In some implementations, where the output(s) from the PL 1 neural decompiler 164 include a sequence of output(s) and probability distributions, the target snippet(s) engine 146 at least selectively generates an additional target source code snippet by selecting token(s) that are not the highest probability token for the output(s) of the sequence. For example, an additional target source code snippet can include one or more (e.g., a subset or all) of the second-highest probability tokens in lieu of the highest probability tokens.

The evaluation engine 148 can be utilized, by the target snippet(s) engine 146, in determining whether additional target source code snippet(s) should be generated. For example, the evaluation engine 148 can evaluate an initial (e.g., highest probability) target source code snippet and, if the evaluation fails to satisfy evaluation condition(s), can cause the target snippet(s) engine 146 to generate additional target source code snippet(s). This process can continue until a target source code snippet that satisfies the evaluation condition(s) is generated, a timeout condition occurs, a threshold quantity of additional target source code snippets have been generated, and/or other condition(s) occur.

In other implementations, the target snippet(s) engine 146 generates multiple target source code snippets initially (i.e., without prompting by the evaluation engine 148). In those implementations, the evaluation engine 148 can evaluate those multiple target source code snippets, serially (e.g., from highest to lowest probability) or in parallel, and select a subset (e.g., one) based on the evaluations. For example, the evaluation engine 148 can select the target source code snippet(s) that satisfy one or more (e.g., all) of the evaluation conditions. As another example, the evaluation engine 148 can select a single target source code snippet, from amongst two or more target source code snippets, by comparing respective metric(s) for their evaluations.

The evaluation condition(s) utilized by the evaluation engine 148 can include, for example, determining whether and/or how closely a target source code snippet conforms to syntax rules of the target programming language. For example, a first target source code snippet can be selected over an additional target source code snippet based at least in part on the first conforming more closely to syntax of PL 1 than does the additional target source code snippet. As another example, a first target source code snippet can be maintained in consideration for selection based at least in part on the first conforming to syntax of PL 1 and/or a second target source code snippet can be excluded from consideration for selection based at least in part on the second failing to conform to syntax of PL 1.

The evaluation condition(s) utilized by the evaluation engine 148 can additionally or alternatively include, for example, whether the target source code snippet can be compiled using compiler(s) for PL 1. For example, a first target source code snippet can be selected over an additional target source code snippet based on the first being compliable whereas the additional target source code snippet is not. As another example, a first target source code snippet can be maintained in consideration for selection based at least in part on the first being successfully compiled using a compiler for PL 1 and/or a second target source code snippet can be excluded from consideration for selection based at least in part on the second failing to compile using the compiler for PL 1.

The evaluation condition(s) utilized by the evaluation engine 148 can additionally or alternatively include, for example, comparing: (a) base output(s), generated using the base source code snippet with corresponding value(s) for variable(s) to (b) target output(s), generated using the target source code output. For example, a given target source code snippet can be executed with three different sets of variables to generate three different target outputs. If those target outputs all match base outputs generated by executing the base source code snippet with the three different sets of variables, the given target source code snippet can be more likely to be selected than if less than three (e.g., none) matched. For instance, two base outputs can be generated. The first base output can be generated by executing (e.g., after compiling) the base source code snippet a first time using "1" for a given variable of the base source code snippet. The second base output can be generated by executing (e.g., after compiling) the base source code snippet a second time using "3" for the given variable. Two target outputs can also be generated. The first target output can be generated by executing (e.g., after compiling) the target source code snippet a first time using "1" for the given variable of the target source code snippet. The second target output can be generated by executing (e.g., after compiling) the target source code snippet a second time using "3" for the given variable. The first and second base outputs can then be compared to the first and second target outputs in evaluating the target source code snippet.

The evaluation condition(s) utilized by the evaluation engine 148 can additionally or alternatively include, for example, generating an embedding for the base source code snippet and generating an embedding for a target source code snippet. The closer the two embeddings are, in embedding space, the more likely the target source code snippet can be to be selected. For example, if the embedding for the target source code snippet is closer, in embedding space, to the base source code snippet than is an additional embedding for an additional target source code snippet, the target source code snippet can be selected over the additional target source code snippet. As another example, if the embedding for the target source code snippet is not within a threshold distance, in embedding space, of the base source code snippet, then the target source code snippet can be excluded from selection. The embedding can be generated, for example, using code2vec, CodeBERT, or other model(s)). In some implementations a first base embedding for the base source code snippet can be generated using a first model (e.g., code2vec) and compared to a first target embedding for the target source code snippet, that is also generated using the first model. A second base embedding can also be generated using a second model (e.g., CodeBERT) and compared to a second target embedding generated using the second model. The evaluation of the target source code snippet can be based on comparison of the first base embedding to the first target embedding, as well as comparison of the second base embedding to the second target embedding.

The variable mapping engine 150 can, when an initially generated target source code snippet includes canonical representation(s), match the canonical representation(s) to corresponding variables of the base source code snippet. The variable mapping engine 150 can then generate a modified target source code snippet that replaces the canonical representation(s) with the corresponding variables. That modified target source code snippet can be what is presented in a developer interface and/or used for execution.

In some implementations, the variable mapping engine 150, in determining whether a given variable matches a given canonical representation, considers context of the given variable in the base source code snippet and the context of the given canonical representation in the target source code snippet. The context(s) considered by the variable mapping engine 150 can include, for example, position, type, preceding term(s) and/or following term(s). For example, the variable mapping engine 150 can compare the position of the given variable relative to other variable(s) in the base source code snippet to the position of the given canonical representation relative to other canonical representation(s) in the target source code snippet. For instance, if the given variable and the given canonical representation have the same relative positions, the variable mapping engine 150 can be more likely to consider them a match. As another example, the variable mapping engine 150 can additionally or alternatively compare the type assigned to a given variable in the base source code snippet to the type assigned to the given canonical representation in the target source code snippet. For instance, if the types match, the variable mapping engine 150 can be more likely to consider them a match. As another example, the variable mapping engine 150 can additionally or alternatively compare preceding term(s) that immediately precede and/or following term(s) that immediately follow the given variable in the base source code snippet to preceding term(s) that immediately precede and/or following term(s) that immediately follow the given canonical representation in the target source code snippet. For instance, if the term(s) that immediately precede and/or immediately follow the given variable match those that immediately precede and/or immediately follow the given canonical representation, the variable mapping engine 150 can be more likely to consider them a match.

As one particular example, the variable mapping engine 150 can determine a given variable is a match to a canonical representation based on the given variable and the canonical representation both being of the same type (e.g., a "double"), both being the second variable/canonical representation positionally, and/or both being preceded and/or followed by certain term(s). For instance, a canonical representation of "v1" can be determined to match a variable of "width" based on "v1" being, in the target source code snippet, of a "double" type and being the second canonical representation, positionally, in the target source code snippet—and "width" likewise being, in the base source code snippet, of a "double" type and being the second variable, positionally, in the base source code snippet.

In some implementations, the variable mapping engine 150, in determining a variable for a canonical representation, can additionally or alternatively, for a given variable mapping in the target source code snippet (i.e., a given replacement of canonical representations with variables), generate output(s) that are each based on executing the target source code snippet (with the given variable mapping) with test input(s) (e.g., certain values for the variables). The variable mapping engine 150 can likewise generate output(s) for the initial base source code snippet, using the same test input(s). The base output(s) generated for the base source code snippet can be compared to the target output(s) generated for the target source code snippet. If the variable mapping engine 150 determines base output(s) match the target output(s), this can indicate that the given variable mapping is correct—and it can be utilized. In some implementations, the variable mapping engine 150 first determines one or more candidate variable mappings using context, then generates test base and target output(s) and compares them to verify one of the candidate variable mappings.

For example, a target source code snippet can include canonical representations of "v1", "v2", and "v3" and the base source code snippet can include variables of "width", "height", and "length". The base source code snippet can be executed with values of "1", "2", and "3" for respective of "width", "height", and "length" to generate base output. Further, the target source code snippet can be executed a first time with values of "1", "2", and "3" for respective of "v1", "v2", and "v3" to generate first target output, then with values of "2", "3", and "1" for respective of "v1", "v2", and "v3" to generate second target output, and so on until all permutations are attempted. If second target output matches the base output, but no other target outputs do, the mapping of v1=height, v2=length, and v3=width can be utilized. Additional base output(s) and target output(s), using different variable values, can likewise be generated to verify a variable mapping and/or to narrow down a correct variable mapping when initial test(s) indicate the base output matches multiple target outputs.

The modified target source code snippet, generated by the variable mapping engine 150, can then be provided to presentation engine 152. Presentation engine 152 can cause the target source code snippet to be rendered in a development application of client device 110. For example, the target source code snippet can be rendered in the development application for review and optional modification by a human developer.

As illustrated in FIG. 1, in some implementations, the client device 110 can have access to the PL 2 code database 166, and can cause (e.g., through a request), the target source code generation system 140 to translate all or portions of PL 2 code database 166 from the second programming language to the target first programming language (or another target language using a decompiler for that other target language). In some of those implementations, the presentation engine 152 can cause the development application of the client device to present multiple target source code snippets, each of which is a translation of a corresponding base source code snippet. Optionally, the target source code snippets can be presented along with (e.g., side by side) the base source code snippet of which it is a translation and/or along with a document string and/or other metadata for the base source code snippet. This can assist the developer in verifying the target source code snippet is an accurate translation of the base source code snippet.

Figure 3:
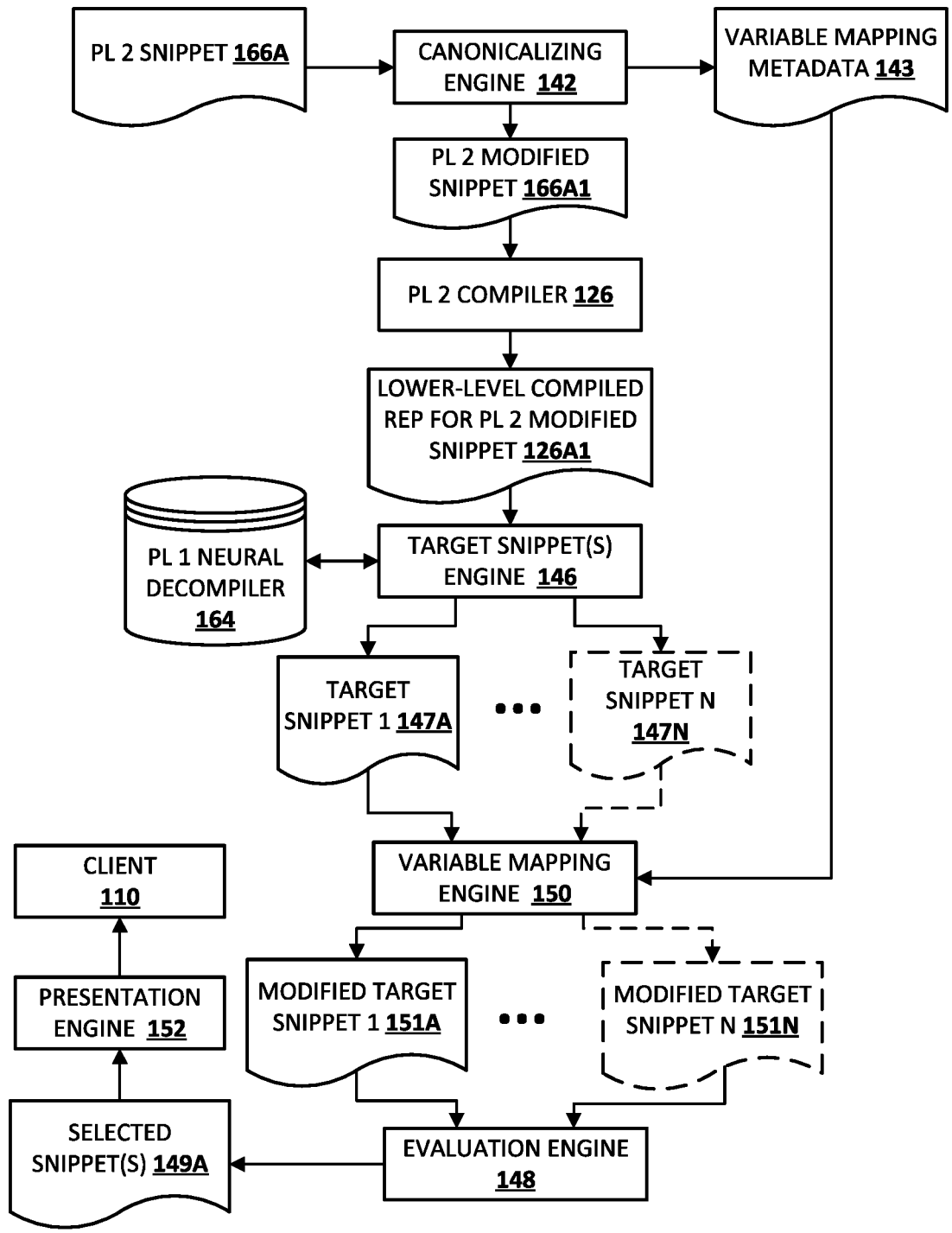
FIG. 3 is a block diagram showing an example of how components of the target source code generation system can generate a target source code snippet, in accordance with various implementations.

Turning now to FIG. 3, a block diagram is illustrated that shows an example of how components of the target source code generation system 140 can generate a target source code snippet 149A for presentation at client device 110, in accordance with various implementations.

In FIG. 3, a PL 2 snippet 166A, from PL 2 database 166, is processed by the canonicalizing engine 142 to generate PL 2 modified snippet 166A1. The canonicalizing engine 142 can, in generating PL 2 modified snippet 166A1, replace variable(s) thereof with corresponding canonical representation(s). Further, the canonicalizing engine 142 can optionally provide variable mapping metadata 143 to variable mapping engine 150 for later use. The variable mapping metadata 143 can include, for example, contextual information for the variables, in PL 2 snippet 166A, that can be used by variable mapping engine 150 in determining which canonical variables, of a target source code snippet, match which variables of the base source code snippet.

The PL 2 compiler 126 processes the PL 2 modified snippet 166A1 to generate a lower-level compiled representation for PL 2 modified snippet 126A1.

The target snippet(s) engine 146 processes lower-level compiled representation for PL 2 modified snippet 126A1, using the trained PL 1 neural decompiler 164, to generate output(s). Further, the target snippet(s) engine 146 determines, based on the generated output(s), at least target snippet 1 147A. For example, multiple outputs can be generated that each include a corresponding probability distribution and the target snippet(s) engine 146 can generate target snippet 1 147A, token-by-token, by selecting the highest probability token indicated by each of the outputs. Optionally, the target snippet(s) engine 146 generates one or more additional target snippets, as indicated by the ellipsis and target snippet N 147N. When multiple target snippets are generated, the additional target snippets can each be based on one or more lower probability token(s) (e.g., as indicated by the output(s)).

Variable mapping engine 150 generates, for target snippet 1 147A, a modified target snippet 1 151A that replaces any canonical representations, in target snippet 1 147A, with corresponding matching variable(s) from the PL 2 snippet 166A. In doing so, the variable mapping engine 150 can consider contextual information included in variable mapping metadata 143 and/or utilize other technique(s) such as those described elsewhere herein. When additional target snippet(s) are generated, the variable mapping engine 150 can likewise generate modified versions thereof, as indicated by the ellipsis and modified target snippet N 151N.

The evaluation engine 148 can evaluate the modified target snippet 1 151A to determine whether it satisfies one or more evaluation conditions, such as those described elsewhere herein. In some implementations, the evaluation engine 148 can also evaluate additional modified target snippets, as indicated by the ellipsis and modified target snippet N 151N.

The evaluation engine 148 determines, based on the evaluation(s), whether to select modified target snippet 1 151A or another of the modified target snippets 151B-N. In some implementations or situations, the evaluation engine 148 selects only a single modified target snippet, such as the highest probability modified target snippet that satisfies all evaluation condition(s) and/or the modified target snippet whose evaluation metric(s) are better than all other modified target snippet(s). In some other implementations or situations, the evaluation engine 148 selects multiple modified target snippets, such as all that satisfy all evaluation condition(s) and/or the two or more modified target snippet whose evaluation metric(s) are better than all other non-selected modified target snippet(s).

The selected snippet(s) 149A, selected by the evaluation engine 148, are then provided to presentation engine 152. The presentation engine 152 causes the selected snippet(s) 149A to be rendered (e.g., visually) on the client device 110. Where multiple selected snippets 149A are selected, they can optionally be presented as alternatives with graphical element(s) to enable a developer to choose one over the other(s). In response to selection of one of the graphical elements, that indicates a given one of the multiple selected snippets 149A, the given one can remain visually displayed and/or maintained as a valid translation of the PL 2 snippet 166A—and all others no longer displayed and/or removed (e.g., from memory) as potential translations of the PL 2 snippet 166A.

Figure 4:
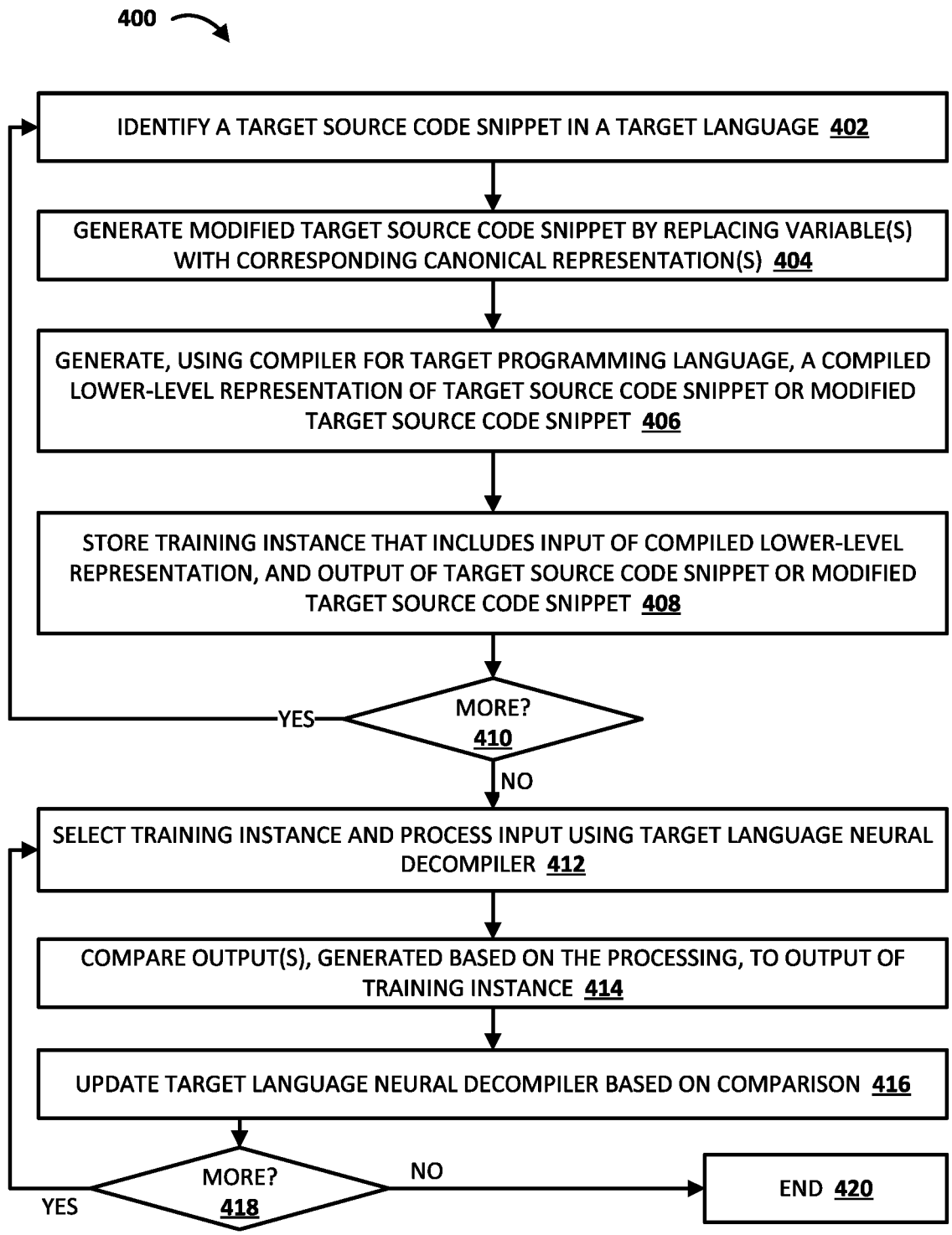
FIG. 4 is a flowchart illustrating an example method of generating training instances and training a target language neural decompiler based on the training instances.

Turning to FIG. 4, a flowchart is illustrated of an example method 400 of generating training instances and training a target language neural decompiler based on the training instances. For convenience, the operations of the flow chart are described with reference to a system that performs the operations. This system may include various components of various computer systems, such as one or more components of the training instance generation system 120 and the training engine 135. Moreover, while operations of method 400 are shown in a particular order, this is not meant to be limiting. One or more operations may be reordered, omitted or added.

At block 402, the system identifies a target source code snippet that is in a target language. For example, the target language can be Python and the target source code snippet can be a line of target source code, or multiple lines of target source code.

At block 404, the system generates a modified target source code snippet by replacing variable(s), of the target source code snippet, with corresponding canonical representation(s). For example, any occurrences of a first variable can be replaced with a first canonical representation and any occurrences of a second variable can be replaced with a distinct second canonical representation.

At block 406, the system generates, using a compiler for the target programming language, a compiled lower-level representation of the target source code snippet of the modified target source code snippet. For example, the system can generate the compiled lower-level representation by compiling the modified target source code snippet using the compiler for the target programming language.

At block 408, the system stores a training instance that includes training instance input of a compiled lower-level representation, and training instance output of the target source code snippet of the modified target source code snippet. For example, where the compiled lower-level representation is of the modified source code snippet, the modified target source code snippet can be used as the training instance output.

At block 410, the system determines whether to generate more training instances. If so, the system proceeds back to block 402 to generate additional training instance(s). The system can determine to generate more training instances if a threshold quantity of training instances has yet to be generated, if a threshold duration of training instances generation has yet to elapse, and/or if unprocessed target source code snippets remain.

It is noted that in some implementations, the system can, at block 402, identify a target source code portion that includes the target source code snippet and additional target source code snippet(s). For example, the portion can include a program module or even an entire program. Accordingly, block 402 can optionally include identifying the target source code snippet and additional target source code snippets of a target source code portion. In some of those implementations, at block 404 the system generates a modified target source code portion by replacing variable(s), of the target source code portion, with corresponding canonical representations. Accordingly, block 404 can optionally include generating the modified target source code snippet and additional modified source code snippets. Further, in some of those implementations, at block 406, the system generates, using the compiler, a lower-level complied representation of the target source code portion or the modified target source code portion. Accordingly, block 408 can optionally include generating the compiled representation of the target source code snippet or the modified target source code snippet, as well as of the additional target source code snippets or modified target source code snippets. In those implementations, metadata, from the compiler, can be used to establish a correspondence between target source code snippets (or modified source code snippets), of the target source code portion, and their corresponding portion of the lower-level compiled representation. Further, in those implementations, block 408 can include storing multiple training instances, where each includes output of one of the target source code snippets (or modified source code snippets) and input of the portion, of the lower-level compiled representation, that corresponds to the target source code snippet of the output. The metadata from the compiler can be used in pairing target (or modified target) source code snippets with a corresponding portion of the lower-level compiled representation.

It is also noted that, in some implementations, additional training instances can be generated using augmentation techniques described herein. For example, a modified target source code snippet, generated at block 404, can be augmented using one or more technique(s) to generate a further modified target source code snippet. That modified target source code snippet can then be processed, using blocks 404 and 406, to generate an additional training instance.

Blocks 402-410 describe training instance generation, whereas blocks 412-420 describe utilizing the training instances to train a neural decompiler for the target language. Block 412-420 can be performed responsive to a "no" determination at block 410 (i.e., after training instance generation is complete) and/or can be performed in parallel with training instance generation.

At block 412, the system selects a training instance, and processes input of the training instance using a target language neural decompiler.

At block 414, the system compares output(s), generated based on the processing, to output of the training instance. Comparing the output(s) generated based on the processing to output of the training instance can include determining a loss based on one or more comparisons.

In some implementations, the output(s) generated based on the processing include a sequence of outputs that each include a corresponding probability distribution over tokens. In some of those implementations, a predicted target source code snippet can be determined, token-by-token, by selecting the highest probability token for each of the outputs. In some of those versions, one or more comparisons between the predicted target source code snippet and the ground truth target source code snippet of the training instance output can be made, and a loss determined based on the comparison(s). The comparison(s) can include, for example, a Levenshtein distance or other string metric between the predicted and ground truth snippets. The comparison(s) can additionally or alternatively include, for example, a comparison between an embedding (e.g., code2vec, CodeBERT) of the predicted target source code snippet and an embedding of the ground truth source code snippet.

In some additional and/or alternative implementations, a comparison between the probability distributions of the sequence of outputs and ground truth probability distributions can additionally or alternatively be utilized in determining the loss. For example, a first output can include a probability distribution that indicates the token of "double" has a 0.67 probability and can also indicate other lower probabilities for other tokens, and a second output can include a probability distribution that indicates the token of "add" has a 0.52 probability and can also indicate other lower probabilities for other tokens. The ground truth probability distribution can be based on the ground truth target source code snippet of the training instance. For example, the ground truth target source code snippet of the training instance can include "double" and "add" in positions that correspond to the first and second output. As a result, a first ground truth probability distribution, that includes 1.0 for "double" and 0.0 for the other tokens, can be determined for the first output. Similarly, a second ground truth probability distribution, that includes 1.0 for "add", and 0.0 for the other tokens, can be determined for the second output. The loss can be based on comparing (e.g., using cross entropy) the probability distribution of the first output to the first ground truth probability distribution, the probability distribution of the second output to the second ground truth probability distribution, and probability distributions of other output(s) to corresponding ground truth probability distributions.

Additional and/or alternative techniques can be utilized in the comparison. Further, one or more of the techniques described herein, and/or other technique(s), can be combined in determining a loss.

At block 416, the system updates the target language neural decompiler based on the comparison of block 414. For example, the system can back-propagate the loss to update weights of the target language neural decompiler. It is noted that, in batch training techniques, the loss utilized to update the target language neural decompiler can be based on comparison(s) for multiple iterations of block 414. For example, an individual loss can be determined for each of multiple training instances at multiple iterations of block 414, and a cumulative loss, that is a function of the individual losses, can be used in the updating of block 414.

At block 418, the system determines whether to perform more training. If not, the system proceeds to block 420 and training ends. If so, the system proceeds back to block 412 to select additional training instance(s) on which to train. The system can determine to perform more training if a threshold quantity of training epochs have yet to be performed, if a threshold duration of training has yet to elapse, if unprocessed training instances remain, and/or if the so-far trained target language neural decompiler fails to meet performance conditions.

Figure 5:
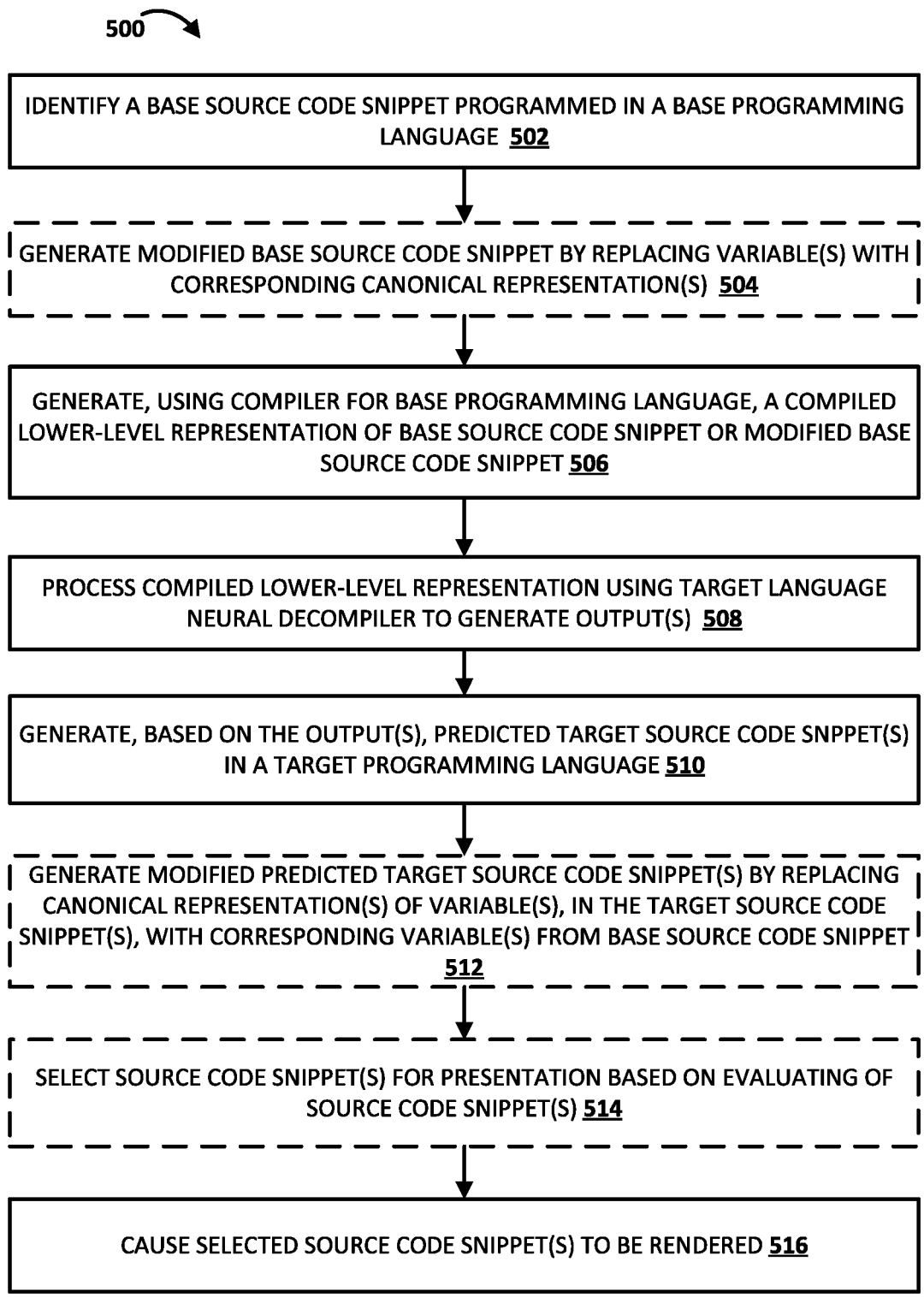
FIG. 5 is a flowchart illustrating an example method of translating a base source code snippet to a target source code snippet.

Turning to FIG. 5, a flowchart is illustrated of an example method 500 of translating a base source code snippet to a target source code snippet. For convenience, the operations of the flow chart are described with reference to a system that performs the operations. This system may include various components of various computer systems, such as one or more components of the target source code generation system 140. Moreover, while operations of method 500 are shown in a particular order, this is not meant to be limiting. One or more operations may be reordered, omitted or added.

At block 502, the system identifies a base source code snippet that is programmed in a base programming language. For example, the base language can be C++ and the base source code snippet can be a line of base source code, or multiple lines of base source code.

At optional block 504, the system generates a modified base source code snippet by replacing variable(s), of the base source code snippet, with corresponding canonical representation(s). For example, any occurrences of a first variable can be replaced with a first canonical representation and any occurrences of a second variable can be replaced with a distinct second canonical representation.

At block 506, the system generates, using a compiler for the base programming language, a compiled lower-level representation of the base source code snippet or the modified base source code snippet. For example, the system can generate the compiled lower-level representation by compiling the modified base source code snippet using the compiler for the base programming language.

At block 508, the system processes the compiled lower-level representation, generated at block 506, using a target language neural decompiler to generate one or more outputs. The target language neural decompiler can be, for example, one trained according to method 400 of FIG. 4.

At block 510, the system generates, based on the output(s) generated at block 508, one or more predicted target source code snippets. For example, assume a sequence of outputs are generated at block 508, where each output includes a corresponding probability distribution. In such an example, the system can generate a target source code snippet, token-by-token, by selecting the highest probability token indicated by each of the outputs. Optionally, the system can generate one or more additional target source code snippets, where each of the additional target source code snippets is based on one or more lower probability token(s) indicated by the output(s). Put another way, an additional target source code snippet can differ from the target source code snippet in at least one token is different and that at least one token is not the highest probability token of a corresponding output (e.g., it is instead the second highest, third highest, etc. probability).

At optional block 512, the system generates modified predicted source code snippet(s) by replacing canonical representation(s) of variable(s), in the target source code snippet(s), with corresponding variable(s) from the base source code snippet. For example, a modified predicted source code snippet can be generated that conforms to one of the target source code snippets, except that all canonical representation(s) of the target source code snippet are replaced with a matching variable from the base source code snippet. In some implementations, in determining whether a given variable matches a given canonical representation, the system considers context of the given variable in the base source code snippet and the context of the given canonical representation in the target source code snippet.

At optional block 514, the system selects one or more source code snippets for presentation based on evaluating the source code snippet(s). For example, the system can select a modified target source code snippet for presentation if one or more evaluations of the modified target source code snippet satisfy evaluation condition(s). For instance, the modified target source code snippet can be selected based on it conforming to syntax of the target programming language, being compliable using a compiler for the target programming language, having an embedding that is within a threshold distance of an embedding of the base source code snippet, and/or when executed with test input(s), having output(s) that match output(s) of the base source code snippet when executed with test input(s). As another example, a first modified target source code snippet can be selected over a second modified target source code snippet based on the first having an embedding that is closer distance-wise to an embedding of the base source code snippet than is an embedding of the second to the embedding of the base source code snippet.

At block 516, the source code snippet(s) selected at block 514 can be caused to be rendered (e.g., in a developer application).

It is noted that in some implementations, the system can, at block 502, identify a base source code portion that includes the base source code snippet and additional base source code snippet(s). For example, the portion can include a program module or even an entire program. Accordingly, block 502 can optionally include identifying the base source code snippet and additional base source code snippets of a base source code portion. In some of those implementations, at block 504 the system generates a modified base source code portion by replacing variable(s), of the base source code portion, with corresponding canonical representations. Accordingly, block 504 can optionally include generating the modified base source code snippet and additional modified base code snippets. Further, in some of those implementations, at block 506, the system generates, using the compiler, a lower-level complied representation of the base source code portion or the modified base source code portion. Accordingly, block 508 can optionally include generating the lower-level compiled representation of the base source code snippet or the modified base source code snippet, as well as of the additional base source code snippets or additional modified base source code snippets. In those implementations, metadata, from the compiler, can be used to establish a correspondence between base source code snippets (or modified base source code snippets), of the base source code portion, and their corresponding portion of the lower-level compiled representation. Further, in those implementations, blocks 508, 510, 512, and 514 can be each be performed multiple times, each time for a different portion of the lower-level compiled representation that corresponds to a different base source code snippet.

Turning now to FIG. 6, example blocks are illustrated that may be performed in evaluating a target source code snippet, alone or in relation to other target source code snippet(s). For example, one or more of the blocks of FIG. 6 may be performed by the system during block 514 of method 500 of FIG. 5. For convenience, the operations of the blocks are described with reference to a system that performs the operations. This system may include various components of various computer systems, such as one or more components of the evaluation engine 148. Moreover, while blocks of method 600 are shown together, any of them may be performed alone, or in combination (serially or parallel) with other block(s).

At block 602, the system determines whether the target source code snippet conforms to syntax of the target programming language. If not, the system can remove the target source code snippet from consideration of being selected. If so, the system can select the target source code snippet, optionally contingent on the determination(s) of one or more other block(s) of FIG. 6.

At block 604, the system determines whether the target source code snippet can be compiled using a compiler for the target programming language. If not, the system can remove the target source code snippet from consideration of being selected. If so, the system can select the target source code snippet, optionally contingent on the determination(s) of one or more other block(s) of FIG. 6.

At block 606, the system determines whether output, of the target source code snippet, if compiled and executed, matches output of the base source code snippet if compiled and executed. For example, the system can apply test input(s) (i.e., certain value(s) for variable(s)) in executing the target source code snippet to generate target output, and can apply the same test input(s) in executing the base source code snippet to generate base output. If the system determines the target output does not match the base output, the system can remove the target source code snippet from consideration of being selected. If the system determines the target output does match the base output, the system can select the target source code snippet, optionally contingent on the determination(s) of one or more other block(s) of FIG. 6. Block 606 optionally includes sub-block 606A, in which the system considers multiple output(s) that are each based on different value(s) for variable(s) (i.e., different test input(s)). For example, the system can compare three or more target outputs to three or more base outputs, where each pair of base and target outputs is generated using a test input that differs from the test inputs used in generating all other of the target and base outputs.

At block 608, the system determines how distant, in embedding space, a generated target embedding for the target source code snippet is to a generated base embedding of the base source code snippet. For example, the system can generate the target embedding by processing the target source code snippet using a code2vec model or other model, and can generate the base embedding by processing the base source code snippet using the same model. In some implementations, the system determines to exclude the target source code snippet based on the distance between the target embedding and the base embedding being greater than a distance threshold. In some implementations, the system determines to select the target source code snippet based on the distance between the target embedding and the base embedding being less than a distance threshold, optionally contingent on the determination(s) of one or more other block(s) of FIG. 6. In some additional or alternative implementations, the system determines whether to select the target source code snippet based on comparing the distance between the target embedding and the base embedding, to an additional distance that is between the base embedding and an additional target embedding for an additional target source code snippet.

At block 604, the system considers size and/or complexity of the target source code snippet in determining whether to select it or remove it from consideration of being selected. For example, if the size and/or complexity are greater than a threshold and/or are greater than a size and/or complexity of an additional target snippet, the target source code snippet can be removed from selection consideration.

Figure 7:
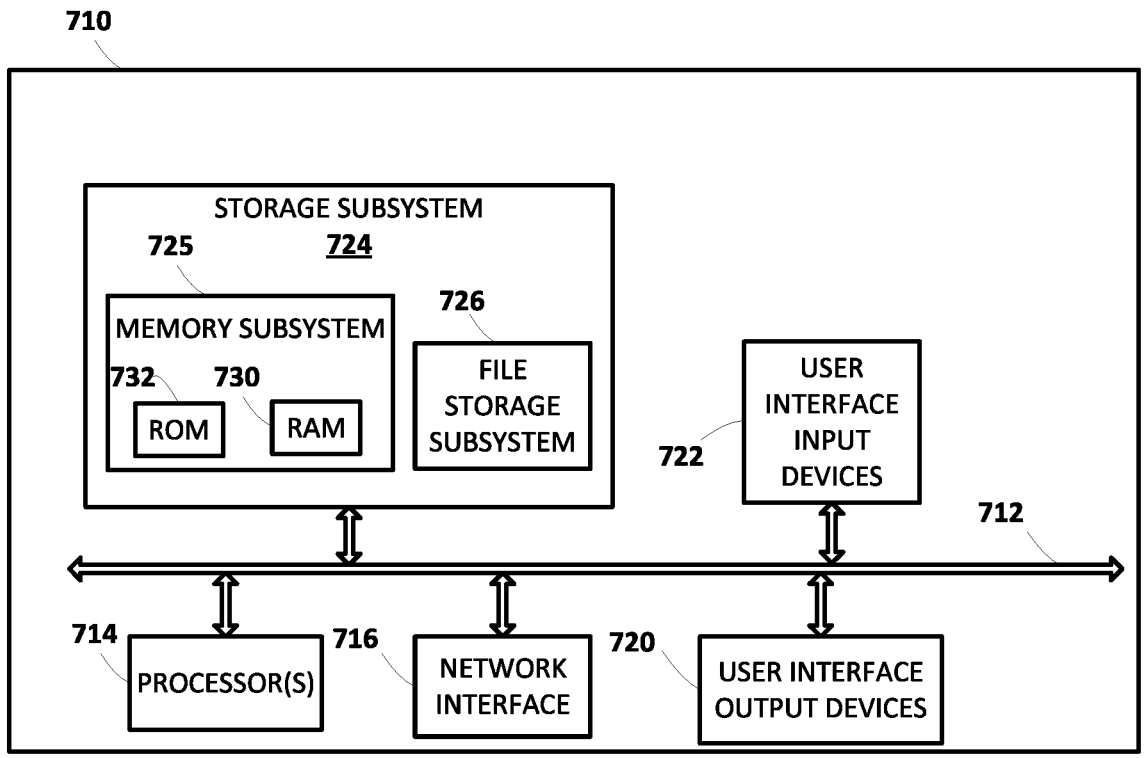
FIG. 7 illustrates an example architecture of a computing device.

FIG. 7 is a block diagram of an example computing device 710 that may optionally be utilized to perform one or more aspects of techniques described herein. Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of FIGS. 4, 5, and 6, as well as to implement various components depicted in FIGS. 1-3.

These software modules are generally executed by processor 714 alone or in combination with other processors.

Memory 725 used in the storage subsystem 724 can include a number of memories including a main random access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In some implementations, a method implemented by one or more processors is provided and includes analyzing a base source code snippet to identify at least a first variable in the base source code snippet. The base source code snippet is programmed in a base higher-level programming language. The method further includes generating a modified base source code snippet, where generating the modified base source code snippet includes replacing each occurrence of the first variable, in the base source code snippet, with a canonical representation selected from a closed set of canonical representations. The method further includes generating, using a compiler for the base programming language, a lower-level compiled representation of the modified base source code snippet. The method further includes processing the lower-level compiled representation using neural network model to generate one or more outputs. The neural network model is trained to decompile lower-level representations to a target higher-level programming language. The method further includes generating, based on the one or more outputs, a predicted target source code snippet in the target higher-level programming language. The predicted target source code snippet includes at least one predicted canonical representation. The method further includes generating a modified predicted target source code snippet that is in the target higher-level programming language, and causing the modified predicted target source code snippet, that is in the target programming language, to be rendered as output of a software development application. Generating the modified target predicted source code snippet can include determining that the predicted canonical representation corresponds to the first variable and, in response to determining that the predicted canonical representation corresponds to the first variable, replacing the predicted canonical representation, in the target source code snippet, with the first variable.

These and other implementations disclosed herein can include one or more of the following features.

In some implementations, a second variable in the base source code snippet is identified in analyzing the source code snippet. In those implementations, generating the modified base source code snippet further includes replacing each occurrence of the second variable, in the base source code snippet, with an additional canonical representation selected from the closed set of canonical representations. Further, in those implementations, the predicted target source code snippet further includes an additional predicted canonical representation, and generating the modified predicted target source code snippet further includes: determining that the additional predicted canonical representation corresponds to the second variable; and, in response to determining that the additional predicted canonical representation corresponds to the second variable, replacing the additional predicted canonical representation, in the target source code snippet, with the second variable.

In some versions of those implementations, determining that the predicted canonical representation corresponds to the first variable and determining that the additional predicted canonical representation corresponds to the second variable includes: executing the base source code snippet, using a first value for the first variable and a second value for the second variable, to generate a base source code output; executing the predicted target source code snippet, using the first value for the predicted canonical representation and using the second value for the additional predicted canonical representation, to generate a predicted target source code output; and in response to determining that the base source code output matches the target source code output, determining that the predicted canonical representation corresponds to the first variable and determining that the additional predicted canonical representation corresponds to the second variable.

In some additional or alternative versions of those implementations, determining that the predicted canonical representation corresponds to the first variable includes: comparing a first base context, of the first variable in the base source code snippet, to a first target context of the predicted canonical representation in the predicted target source code snippet. In some of those additional or alternative versions, the base context includes a position of the first variable in the base source code snippet and/or text that precedes and/or follows the first variable in the base source code snippet, and the target context includes a position of the predicted canonical representation in the predicted target source code snippet and/or text that precedes and/or follows the predicted canonical representation in the predicted target source code snippet.

In some implementations, the method further includes: executing the base source code snippet, using a given value for the first variable, to generate a base source code output; executing the modified predicted target source code snippet, using the given value for the first variable, to generate a predicted target source code output; determining that the base source code output matches the target source code output. In those implementations, rendering the modified predicted target source code snippet is based on determining that the base source code output matches the target source code output.

In some versions of those implementations, rendering the modified target source code snippet based on determining that the base source code output matches the target source code output includes rendering the modified predicted target source code snippet only when it is determined that the base source code output matches the target source code output.

In some other versions of those implementations, rendering the modified target source code snippet based on determining that the base source code output matches the target source code output includes rendering the modified target source code snippet with one or more certain demarcations, or without one or more certain other demarcations, to visually indicate that it has been determined that the base source code output matches the target source code output.

In some implementations, the method further includes: generating, based on the one or more outputs, an additional predicted target source code snippet in the target higher-level programming language; generating an additional modified predicted target source code snippet that is in the target higher-level programming language; and determining to cause rendering of the modified predicted target source code snippet in lieu of the additional modified predicted target source code snippet. Generating the additional modified predicted target source code snippet can include replacing, using the stored mapping, each occurrence of the canonical representation, in the additional predicted target source code snippet, with the first variable. In some versions of those implementations, the method further includes: executing the base source code snippet, using a given value for the first variable, to generate a base source code output; executing the modified predicted target source code snippet, using the given value for the first variable, to generate a target source code output; executing the additional modified predicted target source code snippet, using the given value for the first variable, to generate an additional target source code output; and determining that the base source code output matches the target source code output, and that the base source code output fails to match the additional target source code output. In those versions, determining to cause rendering of the modified predicted target source code snippet in lieu of the additional modified predicted target source code snippet is in response to determining that the base source code output matches the target source code output, and that the base source code output fails to match the additional target source code output. In some of those versions, the one or more outputs include a sequence of outputs and each output, in the sequence of outputs, includes a corresponding probability distribution over tokens. Further, generating the additional predicted target source code snippet is based on the sequence of outputs and includes selecting a given token for inclusion, at a given position in the additional predicted target source code snippet, based on the given token having the highest probability in the corresponding probability distribution for a given output in the sequence of outputs. Yet further, generating, based on the sequence of outputs, the predicted target source code snippet includes selecting an alternative token for inclusion, at the given position in the additional predicted target source code snippet and in lieu of the given token, based on the alternative token having the second highest probability in the corresponding probability distribution for the given output in the sequence of outputs. Yet further, in some of those versions, the method further includes: executing the base source code snippet, using a given value for the first variable, to generate a base source code output; executing the additional modified predicted target source code snippet, using the given value for the first variable, to generate an additional target source code output; and determining that the base source code output fails to match the additional target source code output. In such versions, generating the predicted target source code snippet is in response to determining that the base source code output fails to match the additional target source code output.

In some implementations, the neural network model is a sequence-to-sequence neural network model that includes an encoder and a decoder.

In some implementations, the neural network model is trained using a plurality of training instances each including: training instance labeled output that includes a canonicalized version of a corresponding target source code snippet, in the target higher-level programming language; and training instance input that includes a corresponding lower-level compiled representation, of the corresponding target source code snippet, generated using an additional compiler for the target programming language. In some versions of those implementations, the lower-level compiled representation and the corresponding lower-level compiled representations are each bytecode, assembly code, or object code.

In some additional or alternative versions of those implementations, the method further includes selecting the training instances, from a superset of training instances, based on the training instances each satisfying a code complexity condition and/or a filtering condition; and training the neural network model based on the training instances.

In some implementations, a method implemented by one or more processors is provided and includes processing a lower-level compiled representation, using a sequence-to-sequence neural network model to generate a sequence of outputs. The lower-level compiled representation is a compiled representation of a base source code snippet that is in a base higher-level programming language. The outputs of the sequence each include a corresponding probability distribution, and the neural network model is trained to decompile lower-level representations to a target higher-level programming language. The method further includes generating, based on the corresponding probability distributions of the sequence of outputs, a first predicted target source code snippet in the target higher-level programming language, and a second predicted target source code snippet in the target higher-level programming language. The first predicted target source code snippet is generated based on highest probabilities in the corresponding probability distributions of the sequence of outputs. The second predicted target source code snippet includes one or more portions that differ from the first predicted target source code snippet based on the one or more portions being generated based on non-highest probabilities in the corresponding probability distributions of the sequence of outputs. The method further includes evaluating the first predicted target source code snippet and evaluating the second predicted target source code snippet. The method further includes selecting, based on the evaluations, the second predicted target source code snippet over the first predicted target source code snippet and causing, in response to the selecting, the second predicted target source code snippet to be rendered as output of a software development application.

These and other implementations disclosed herein can include one or more of the following features.

In some implementations, the method further includes identifying the base source code snippet for the lower-level compiled representation and executing the base source code snippet to generate a base source code output. In those implementations, evaluating the first predicted target source code snippet includes executing the first predicted target source code snippet to generate a first target source code output, and determining that the base source code output fails to match the first target source code output. In those implementations, evaluating the second predicted target source code snippet includes executing the second predicted target source code snippet to generate a second target source code output, and determining that the base source code matches the second target source code output. In some of those implementations, generating the second predicted target source code snippet and/or evaluating the second predicted target source code snippet are performed in response to determining that the base source code output fails to match the first target source code output.

In some implementations, evaluating the first predicted target source code snippet includes analyzing the first predicted target source code snippet with respect to a syntax for the target higher-level programming language, and determining that the first predicted target source code snippet fails to conform to the syntax. In those implementations, evaluating the second predicted target source code snippet includes analyzing the second predicted target source code language with respect to the syntax, and determining that the second predicted target source code snippet conforms to the syntax. In some of those implementations, generating the second predicted target source code snippet and/or evaluating the second predicted target source code snippet are performed in response to determining that the first predicted target source code snippet fails to conform to the syntax In some implementations, the method further includes identifying the base source code snippet for the lower-level compiled representation and processing the base source code snippet using an embedding model to generate a base source code embedding. In those implementations, evaluating the first predicted target source code snippet includes processing the first predicted target source code snippet using the embedding model to generate a first predicted target source code embedding, and evaluating the first predicted target source code snippet based on a first distance between the base source code embedding and the first predicted target source code embedding. Further, in those implementations evaluating the second predicted target source code snippet includes processing the second predicted target source code snippet using the embedding model to generate a second predicted target source code embedding, and evaluating the first predicted target source code snippet based on a second distance between the base source code embedding and the second predicted target source code embedding. In some versions of those implementations, generating the second predicted target source code snippet and/or evaluating the second predicted target source code snippet are performed in response to determining that the first distance fails to satisfy a threshold.

In some implementations, evaluating the first predicted target source code snippet includes determining that the first predicted target source code snippet cannot be compiled using a compiler for the target higher-level programming language. In those implementations, evaluating the second predicted target source code snippet includes determining that the second predicted target source code snippet can be compiled using the compiler for the target higher-level programming language.

In some of those implementations, the method further includes identifying the base source code snippet for the lower-level compiled representation, and generating a modified base source code segment by replacing each of any variables in the base source code segment with corresponding canonical variables. In those implementations, generating, using the compiler, the lower-level compiled representation of the base source code snippet includes compiling the modified base source code segment using the compiler. In some of those implementations, generating the first predicted target source code snippet in the target higher-level programming language includes selecting the corresponding canonical variables based on the corresponding probability distributions of the sequence of outputs, then replacing the corresponding canonical variables with corresponding of the variables in the base source code segment.

In addition, some implementations include one or more processors (e.g., CPU(s), GPU(s), and/or TPU(s)) of one or more computing devices, where the one or more processors are operable to execute instructions stored in associated memory, and where the instructions are configured to cause performance of any of the methods disclosed herein. Some implementations also include one or more non-transitory computer readable storage media storing computer instructions executable by one or more processors to perform any of the methods disclosed herein.

What is claimed is:

1. A method implemented by one or more processors, the method comprising:

analyzing a base source code snippet to identify at least a first variable in the base source code snippet, wherein the base source code snippet is programmed in a base higher-level programming language;

generating a modified base source code snippet, wherein generating the modified base source code snippet comprises replacing each occurrence of the first variable, in the base source code snippet, with a canonical representation selected from a closed set of canonical representations;

generating, using a compiler for the base programming language, a lower-level compiled representation of the modified base source code snippet;

processing the lower-level compiled representation using a neural network model to generate one or more outputs, wherein the neural network model is trained to decompile lower-level representations to a target higher-level programming language;

generating, based on the one or more outputs, a predicted target source code snippet in the target higher-level programming language, the predicted target source code snippet comprising at least one predicted canonical representation;

generating a modified predicted target source code snippet that is in the target higher-level programming language, wherein generating the modified target predicted source code snippet comprises:
  determining that the predicted canonical representation corresponds to the first variable, and
  in response to determining that the predicted canonical representation corresponds to the first variable, replacing the predicted canonical representation, in the target source code snippet, with the first variable;

executing the base source code snippet, using a given value for the first variable, to generate a base source code output;

executing the modified predicted target source code snippet, using the given value for the first variable, to generate a predicted target source code output;

determining that the base source code output matches the target source code output; and causing the modified predicted target source code snippet, that is in the target programming language, to be rendered as output of a software development application,
  wherein rendering the modified predicted target source code snippet comprises rendering the modified target source code snippet with one or more certain demarcations, or without one or more certain other demarcations, to visually indicate that it has been determined that the base source code output matches the target source code output.

2. The method of claim 1,
wherein a second variable in the base source code snippet is identified in analyzing the source code snippet, wherein generating the modified base source code snippet further comprises replacing each occurrence of the second variable, in the base source code snippet, with an additional canonical representation selected from the closed set of canonical representations;
wherein the predicted target source code snippet further comprises an additional predicted canonical representation; and
wherein generating the modified predicted target source code snippet further comprises:
 determining that the additional predicted canonical representation corresponds to the second variable, and
 in response to determining that the additional predicted canonical representation corresponds to the second variable, replacing the additional predicted canonical representation, in the target source code snippet, with the second variable.

3. The method of claim 2, wherein determining that the predicted canonical representation corresponds to the first variable and determining that the additional predicted canonical representation corresponds to the second variable, comprises:
 executing the base source code snippet, using the first value for the first variable and a second value for the second variable, to generate the base source code output;
 executing the predicted target source code snippet, using the first value for the predicted canonical representation and using the second value for the additional predicted canonical representation, to generate the predicted target source code output; and
 in response to determining that the base source code output matches the target source code output, determining that the predicted canonical representation corresponds to the first variable and determining that the additional predicted canonical representation corresponds to the second variable.

4. The method of claim 2, wherein determining that the predicted canonical representation corresponds to the first variable comprises:
 comparing a first base context, of the first variable in the base source code snippet, to a first target context of the predicted canonical representation in the predicted target source code snippet.

5. The method of claim 4,
wherein the base context comprises one or more of:
 a position of the first variable in the base source code snippet,
 preceding text that precedes the first variable in the base source code snippet, or
 following text that follows the first variable in the base source code snippet, and wherein the target context comprises one or more of:
 a position of the predicted canonical representation in the predicted target source code snippet,
 preceding text that precedes the predicted canonical representation in the predicted target source code snippet, or
 following text that follows the first variable in the base source code snippet.

6. The method of claim 1, further comprising:
generating, based on the one or more outputs, an additional predicted target source code snippet in the target higher-level programming language;
generating an additional modified predicted target source code snippet that is in the target higher-level programming language, generating the additional modified predicted target source code snippet comprising replacing, using the stored mapping, each occurrence of the canonical representation, in the additional predicted target source code snippet, with the first variable; and
determining to cause rendering of the modified predicted target source code snippet in lieu of the additional modified predicted target source code snippet.

7. The method of claim 6, further comprising:
executing the additional modified predicted target source code snippet, using the given value for the first variable, to generate an additional target source code output; and
determining that the base source code output fails to match the additional target source code output;
 wherein determining to cause rendering of the modified predicted target source code snippet in lieu of the additional modified predicted target source code snippet is in response to determining that the base source code output matches the target source code output, and that the base source code output fails to match the additional target source code output.

8. The method of claim 7,
wherein the one or more outputs comprise a sequence of outputs and wherein each output, in the sequence of outputs, comprises a corresponding probability distribution over tokens;
wherein generating the additional predicted target source code snippet is based on the sequence of outputs and comprises selecting a given token for inclusion, at a given position in the additional predicted target source code snippet, based on the given token having the highest probability in the corresponding probability distribution for a given output in the sequence of outputs; and
wherein generating, based on the sequence of outputs, the predicted target source code snippet comprises selecting an alternative token for inclusion, at the given position in the additional predicted target source code snippet and in lieu of the given token, based on the alternative token having the second highest probability in the corresponding probability distribution for the given output in the sequence of outputs.

9. The method of claim 8,
wherein generating the predicted target source code snippet is in response to determining that the base source code output fails to match the additional target source code output.

10. The method of claim 1, wherein the neural network model is a sequence-to-sequence neural network model that comprises an encoder and a decoder.

11. The method of claim 1, wherein the neural network model is trained using a plurality of training instances each comprising:
 training instance labeled output that includes a canonicalized version of a corresponding target source code snippet, in the target higher-level programming language, and
 training instance input that includes a corresponding lower-level compiled representation, of the corresponding target source code snippet, generated using an additional compiler for the target programming language.

12. The method of claim 11, wherein the lower-level compiled representation and the corresponding lower-level compiled representations are each bytecode, assembly code, or object code.

13. The method of claim 11, further comprising:
selecting the training instances, from a superset of training instances, based on the training instances each satisfying a code complexity condition or a filtering condition; and
training the neural network model based on the training instances.

14. A system, comprising:
memory storing instructions;
one or more processors operable to execute the instructions, stored in the memory, to cause the one or more processors to:
analyze a base source code snippet to identify at least a first variable in the base source code snippet, wherein the base source code snippet is programmed in a base higher-level programming language;
generate a modified base source code snippet, wherein generating the modified base source code snippet comprises replacing each occurrence of the first variable, in the base source code snippet, with a canonical representation selected from a closed set of canonical representations;
generate, using a compiler for the base programming language, a lower-level compiled representation of the modified base source code snippet;
process the lower-level compiled representation using a neural network model to generate one or more outputs, wherein the neural network model is trained to decompile lower-level representations to a target higher-level programming language;
generate, based on the one or more outputs, a predicted target source code snippet in the target higher-level programming language, the predicted target source code snippet comprising at least one predicted canonical representation;
generate a modified predicted target source code snippet that is in the target higher-level programming language, wherein in generating the modified target predicted source code snippet one or more of the processors are to:
determine that the predicted canonical representation corresponds to the first variable, and
in response to determining that the predicted canonical representation corresponds to the first variable, replace the predicted canonical representation, in the target source code snippet, with the first variable;
execute the base source code snippet, using a given value for the first variable, to generate a base source code output;
execute the modified predicted target source code snippet, using the given value for the first variable, to generate a predicted target source code output;
determine that the base source code output matches the target source code output; and
cause the modified predicted target source code snippet, that is in the target programming language, to be rendered as output of a software development application,
wherein rendering the modified predicted target source code snippet comprises rendering the modified target source code snippet with one or more certain demarcations, or without one or more certain other demarcations, to visually indicate that it has been determined that the base source code output matches the target source code output.

15. The system of claim 14, wherein in executing the instructions one or more of the processors are further to:
generate, based on the one or more outputs, an additional predicted target source code snippet in the target higher-level programming language;
generate an additional modified predicted target source code snippet that is in the target higher-level programming language, wherein in generating the additional modified predicted target source code snippet one or more of the processors are to replace, using the stored mapping, each occurrence of the canonical representation, in the additional predicted target source code snippet, with the first variable; and
determine to cause rendering of the modified predicted target source code snippet in lieu of the additional modified predicted target source code snippet.

16. The system of claim 15, wherein in executing the instructions one or more of the processors are further to:
execute the additional modified predicted target source code snippet, using the given value for the first variable, to generate an additional target source code output; and
determine that the base source code output fails to match the additional target source code output;
wherein determining to cause rendering of the modified predicted target source code snippet in lieu of the additional modified predicted target source code snippet is in response to determining that the base source code output matches the target source code output, and that the base source code output fails to match the additional target source code output.

17. The system of claim 14, wherein the neural network model is trained using a plurality of training instances each comprising:
training instance labeled output that includes a canonicalized version of a corresponding target source code snippet, in the target higher-level programming language, and
training instance input that includes a corresponding lower-level compiled representation, of the corresponding target source code snippet, generated using an additional compiler for the target programming language.

18. One or more non-transitory computer readable computer readable storage media storing computer instructions executable by one or more processors to perform a method comprising:
analyzing a base source code snippet to identify at least a first variable in the base source code snippet, wherein the base source code snippet is programmed in a base higher-level programming language;
generating a modified base source code snippet, wherein generating the modified base source code snippet comprises replacing each occurrence of the first variable, in the base source code snippet, with a canonical representation selected from a closed set of canonical representations;
generating, using a compiler for the base programming language, a lower-level compiled representation of the modified base source code snippet;

processing the lower-level compiled representation using a neural network model to generate one or more outputs, wherein the neural network model is trained to decompile lower-level representations to a target higher-level programming language;

generating, based on the one or more outputs, a predicted target source code snippet in the target higher-level programming language, the predicted target source code snippet comprising at least one predicted canonical representation;

generating a modified predicted target source code snippet that is in the target higher-level programming language, wherein generating the modified target predicted source code snippet comprises:
  determining that the predicted canonical representation corresponds to the first variable, and
  in response to determining that the predicted canonical representation corresponds to the first variable, replacing the predicted canonical representation, in the target source code snippet, with the first variable;

executing the base source code snippet, using a given value for the first variable, to generate a base source code output;

executing the modified predicted target source code snippet, using the given value for the first variable, to generate a predicted target source code output;

determining that the base source code output matches the target source code output; and causing the modified predicted target source code snippet, that is in the target programming language, to be rendered as output of a software development application,
  wherein rendering the modified predicted target source code snippet comprises rendering the modified target source code snippet with one or more certain demarcations, or without one or more certain other demarcations, to visually indicate that it has been determined that the base source code output matches the target source code output.

19. The one or more non-transitory computer readable computer readable storage media of claim 18,
  wherein a second variable in the base source code snippet is identified in analyzing the source code snippet, wherein generating the modified base source code snippet further comprises replacing each occurrence of the second variable, in the base source code snippet, with an additional canonical representation selected from the closed set of canonical representations;
  wherein the predicted target source code snippet further comprises an additional predicted canonical representation; and
  wherein generating the modified predicted target source code snippet further comprises:
    determining that the additional predicted canonical representation corresponds to the second variable, and
    in response to determining that the additional predicted canonical representation corresponds to the second variable, replacing the additional predicted canonical representation, in the target source code snippet, with the second variable.

20. The one or more non-transitory computer readable computer readable storage media of claim 19, wherein determining that the predicted canonical representation corresponds to the first variable comprises:
  comparing a first base context, of the first variable in the base source code snippet, to a first target context of the predicted canonical representation in the predicted target source code snippet.

* * * * *